United States Patent [19]
Serino et al.

[11] 3,733,102
[45] May 15, 1973

[54] AUTOMOBILE CAMPERS

[75] Inventors: Andrew Serino, Denver; Joseph A. Cwik, Arvada, both of Colo.

[73] Assignees: Andrew Serino, Denver; Joseph A. Cwik, Arvada, both of Colo.

[22] Filed: Jan. 15, 1971

[21] Appl. No.: 106,789

[52] U.S. Cl. ............................296/23 MC, 224/42.1
[51] Int. Cl. ...............................................B60p 3/32
[58] Field of Search ............296/23, 23 C, 23 MC, 296/31 P; 224/42.1

[56] References Cited

UNITED STATES PATENTS

| | | | |
|---|---|---|---|
| 3,321,876 | 5/1967 | Birkenheuer | 296/23 MC |
| 3,003,810 | 10/1961 | Kloote | 296/31 P |
| 2,739,833 | 3/1956 | Schenkel | 296/23 C |

*Primary Examiner*—Philip Goodman
*Attorney*—Van Valkenburgh & Lowe

[57] ABSTRACT

A collapsible camper room adapted to be mounted upon the top of an automobile. The camper is carried upon a deck with a nest of wall sections above the deck adapted to extend upwardly to expand into a room. The construction is of a lightweight, honeycomb core paneling with improved modes of fabricating and joining the paneling to produce a rigid, lightweight unit. The raising and lowering of the nested wall sections is effected by corner posts operatively interlocked to raise and lower in unison.

7 Claims, 23 Drawing Figures

PATENTED MAY 15 1973

*INVENTORS*
Andrew Serino
Joseph A. Cwik

BY
ATTORNEYS

INVENTOR.S
Andrew Serino
BY Joseph A. Cwik
Van Valkenburgh & Lowe
ATTORNEYS

INVENTORS
Andrew Serino
Joseph A. Cwik
BY Van Valkenburgh & Lowe
ATTORNEYS

INVENTORS
Andrew Serino
Joseph A. Cwik
BY Von Valkenburgh & Lowe
ATTORNEYS

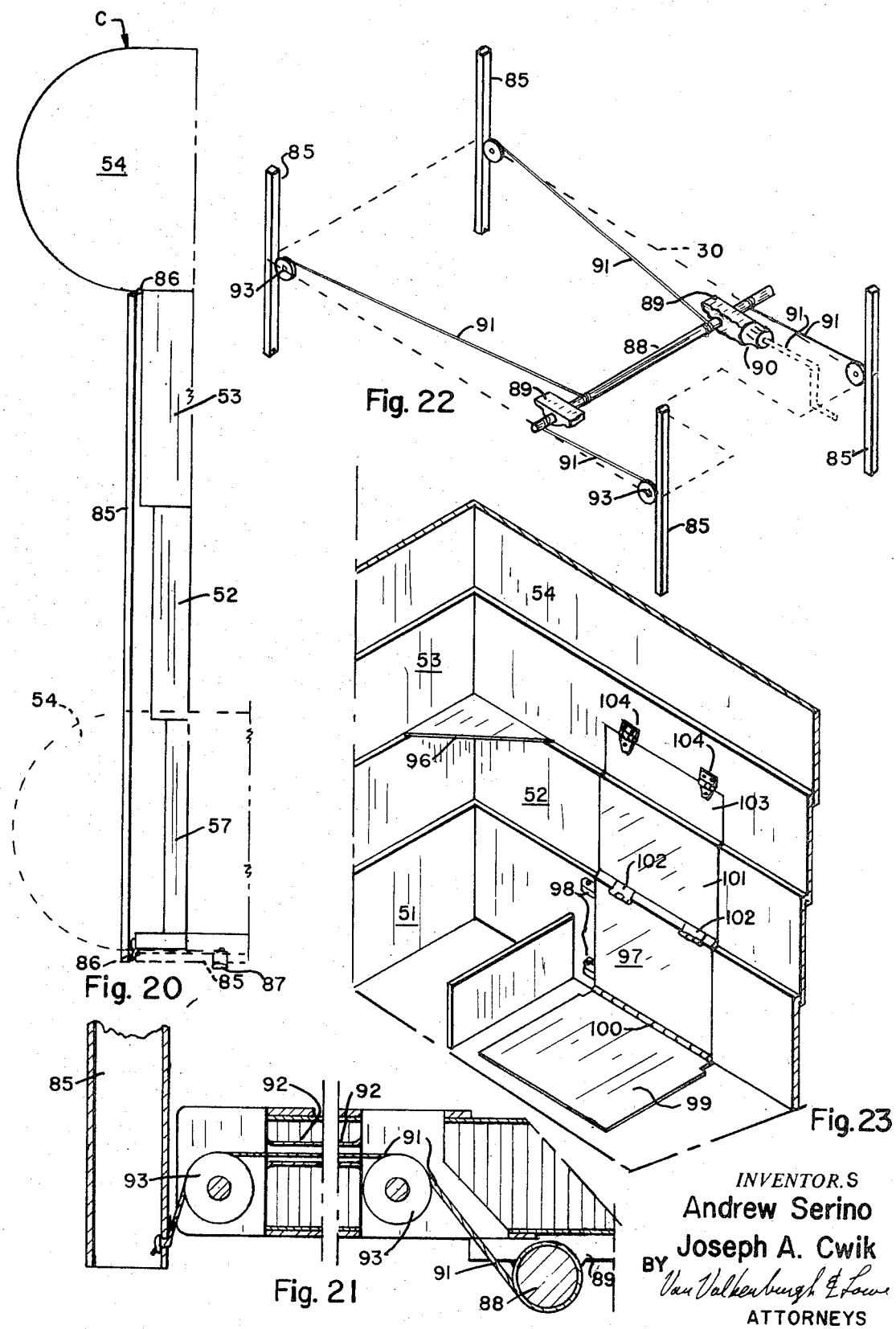

AUTOMOBILE CAMPERS

This invention relates to improvements in campers for vehicles and more particularly for a camper which is especially adapted to be carried upon an automobile. As such, the invention will be called an "automobile camper."

A primary object of the invention is to provide a novel and improved automobile camper, to be mounted upon the top of an automobile, which is constructed in such a manner that it can meet and comply with requirements of stability, limitations and weight, structural integrity and compactness which have generally heretofore been considered impossible to attain where a camper is mounted on top of an automobile.

The construction of this improved camper is rendered possible by the use of lightweight, honeycomb panels. The manufacture of lightweight structural panels using a honeycomb core covered with skins of metal or other rigid sheet material is well known. Accordingly, the panels will be hereinafter referred to as "Verticel," a tradename commonly accepted for such panels. Even though the material is known, the physical and structural properties of Verticel are not fully appreciated by most people. First, Verticle is an excellent insulation. Moreover, panels of other materials having comparable strength and rigidity are far heavier than a Verticel panel while panels of other materials having comparable weight are far more flexible and flimsy. With such desirable properties, it would at first seem surprising that Verticel panels have not been more widely used. However, there has heretofore existed difficult problems in the construction of such panels and in fabricating and joining these panels.

The manufacture of campers primarily for trucks and trailers has become a large industry throughout the country and in connection with such manufacture, a large amount of panel material is used. However, at present, such campers are built only for installations on either pickup trucks or trailers because of their considerable weight. There is also a need for a camper construction which may be mounted on top of an automobile. Such has heretofore been proposed but little has been accomplished toward the development of a satisfactory automobile camper.

To meet this need for an automobile camper, it has been proposed to provide a deck upon the top of an automobile and to mount a tent upon this deck so that it may serve as a temporary shelter. While such a construction is sufficiently light in weight to be useable, it is not at all acceptable. Tents are flimsy, afford little weather protection and require a substantial setup time. Any automobile camper built according to the present conventional standards for truck campers would be excessively heavy. Moreover, if a standard automobile had a camper mounted upon top of it to provide at least a sleeping room for the automobile passengers, it would have to be folded into a compact package when it was not in use and the automobile was on the road. This can be done by telescoping nesting segments together, which has heretofore been proposed. However, if an automobile camper were built according to the construction of conventional, common truck campers, it would necessarily weigh in excess of 1,000 pounds. Such a load on top of a car would raise the center of gravity above a safe, permissible limit.

The present invention was conceived and developed with the above considerations in view and comprises, in essence, an automobile camper which is formed as an array of telescoped sidewall sections mounted upon a deck. The deck is adapted to be affixed to the top of an automobile and the camper is collapsed into a compact, flat unit when not in use, but expanded into a comfortable room when in use. The present invention contemplates the use of Verticel panels and improved methods for forming such panels to obtain a structure sufficiently light in weight as to permit mounting it upon the top of an automobile and the invention further contemplates the use of improved modes of joining Verticel panels into rigid, monocoque-type components suitable for the purpose at hand.

It follows that another object of the present invention is to provide a novel and improved automobile camper which may be securely mounted upon the top of an automobile as a compact, telescoped unit.

Another object of the invention is to provide an automobile camper which is so light in weight that it may be safely carried upon the top of an automobile.

Another object of the invention is to provide an automobile camper which is normally telescoped into a compact package and which includes a simple, easily operated mechanism for expanding the camper into a room when it is to be used.

Another object of the invention is to provide a novel and improved collapsible automobile camper which is formed of Verticel panels adapted to produce a well insulated, rigid, strong array of components having a minimum possible weight.

Another object of the invention is to provide novel and improved methods for joining verticel panels to permit the construction of rigid, lightweight campers.

Another object of the invention is to provide a novel and improved method of fabricating a verticel panel to render the same more suitable for forming and joining into panels.

With the foregoing and other objects in view, all of which more fully hereinafter appear, my invention comprises certain constructions, combinations and arrangements of parts and elements as hereinafter described, defined in the appended claims, and illustrated in preferred embodiment by the accompanying drawing in which:

Figure 5:
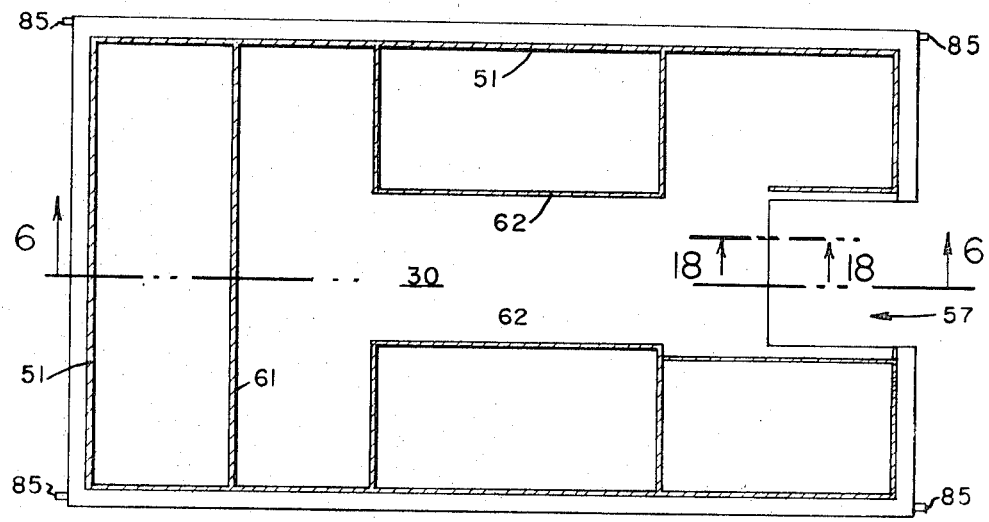
FIG. 5 is a sectional plan view of the camper as taken from the indicated line 5—5 at FIG. 2, but on an enlarged scale.
Figure 6:
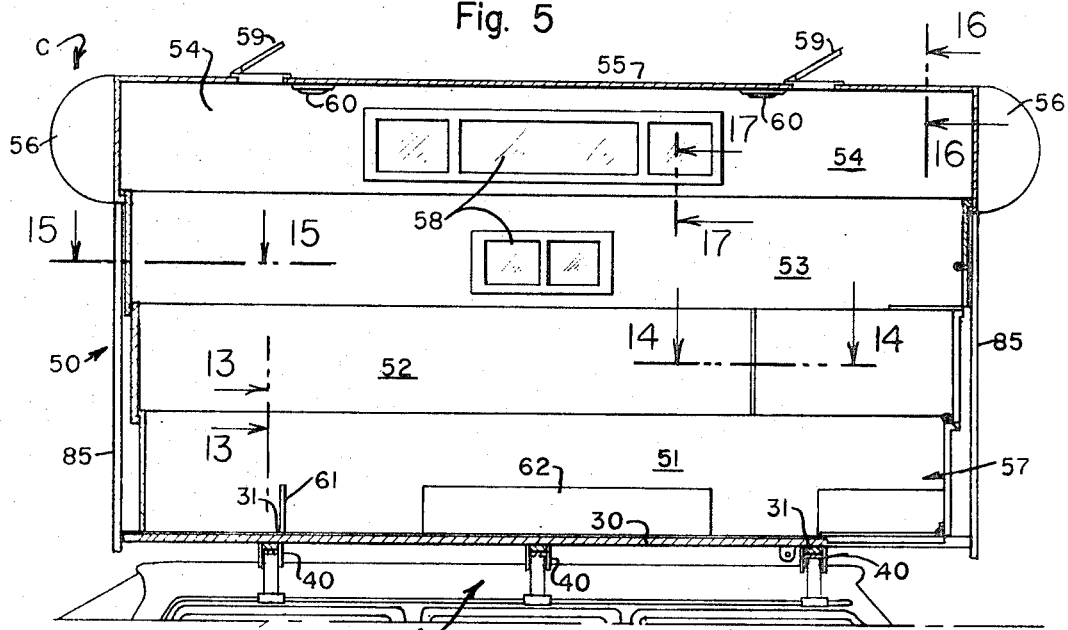
FIG. 6 is a longitudinal sectional elevation view of the camper as taken from the indicated line 6—6 at FIG. 5 but with the automobile whereon the camper is mounted being shown.
Figure 7:
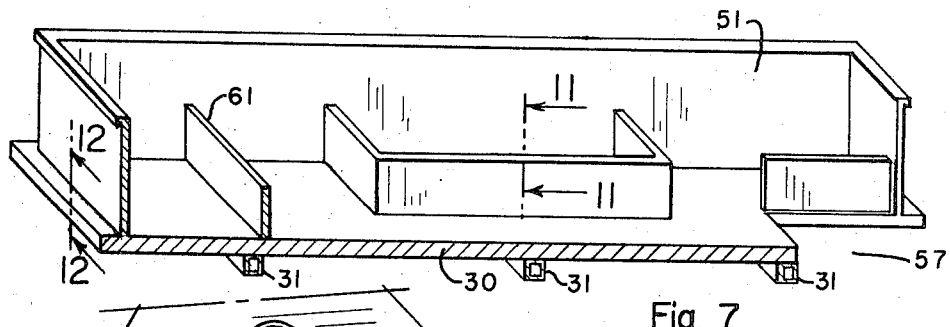
FIG. 7 is an isometric, longitudinal sectional view of the deck and first section of the camper illustrative of the manner in which side wall panel components and the floor deck are joined together to rigidify the entire structure.

FIGS. 13 through 18 are fragmentary sectional detail views of other connections between the panels shown by FIGS. 6 and 7 with their respective locations being indicated by lines 13—13, 14—14, 15—15, 16—16, 17—17 and 18—18 at FIGS. 5, 6 and 7.

Figure 1:
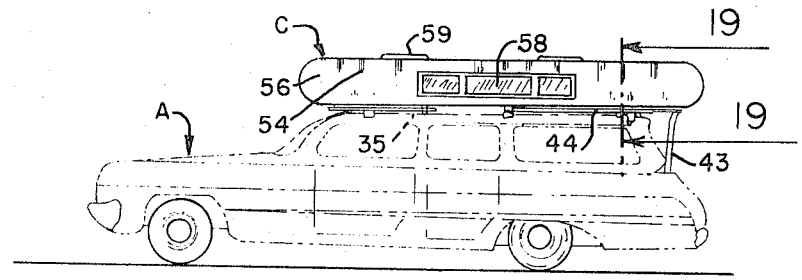
FIG. 1 is a side elevation view of the improved collapsible automobile camper mounted upon an automobile and in a normally collapsed position.
Figure 19:
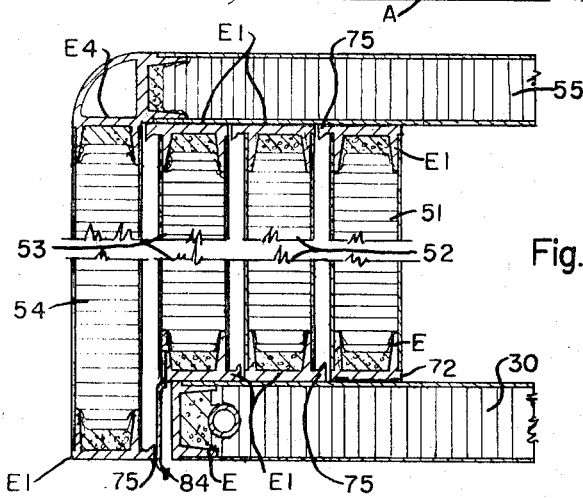
Figure 11:
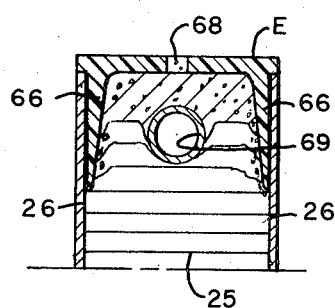
FIG. 11 is a fragmentary sectional detail as taken from the indicated line 11—11 at FIG. 7 but on an enlarged scale and illustrating the manner in which the cap shown at FIG. 10 is mounted on the edge of the Verticel panel.
Figure 13:
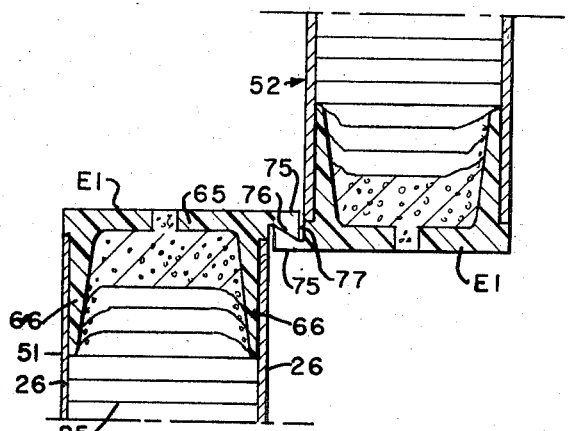
Figure 16:
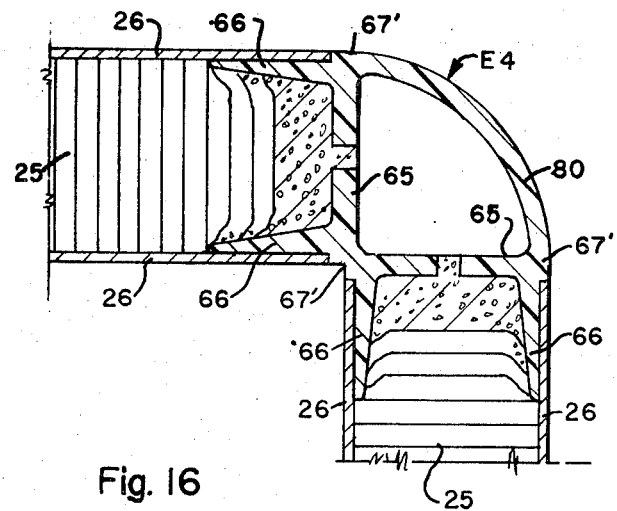

FIG. 19 is a fragmentary sectional detail of a side of the camper as taken from the indicated line 19—19 at FIG. 1, but on a greatly enlarged scale, with portions broken away to conserve space and showing the manner in which the edge components shown at FIGS. 11, 13 and 16 are used in the deck and wall sections of the camper.

FIG. 20 is a fragmentary side elevational view of a corner portion of the camper illustrative of the manner in which one of the corner support posts is held when expanding the camper with dotted lines indicating the position of the upper section of the camper and the support post when the unit is collapsed.

FIG. 21 is a fragmentary sectional detail through the deck of the camper, as taken from the indicated line 20—20 at FIG. 5, but on an enlarged scale and with portions broken away to conserve space, the figure showing part of the mechanism for lifting a support post.

FIG. 22 is an isometric, diagrammatic phantom view showing the camper deck in broken lines and showing the four corner support posts for the camper with the lift cables and lifting mechanism carried within and beneath the floor deck of the camper.

FIG. 23 is a fragmentary isometric interior view of the rear portion of the camper to show the opening and door construction therein.

Referring more particularly to the drawing, FIGS. 1 through 7 are illustrative of the general organization of an automobile camper constructed according to the invention, the drawings showing only the basic shell of the camper, omitting furnishings such as those which would ordinarily be provided in a camper. FIGS. 19 through 22 are illustrative of other specific features of the camper as will be described.

The camper C is illustrated as being placed upon the top of an automobile A. Its proportions will be dictated by the size of the automobile. For example, it may be seven feet wide and 12 feet long. As such, the camper C can be expanded into a suprisingly large room sufficient to provide the occupants of the car room for sleeping, living and even cooking activities.

The mounting of a unit of such size upon the top of an automobile can be a serious hazard unless it is of a very lightweight construction. From experience obtained in the past by using luggage racks on the tops of automobiles, the camper including the furnishings must weigh not more than approximately 300 pounds if it is to be considered safe. This is to be contrasted with a camper of comparable size for pickup trucks, which will weigh from between 1,500 and 3,000 pounds.

Figure 8:
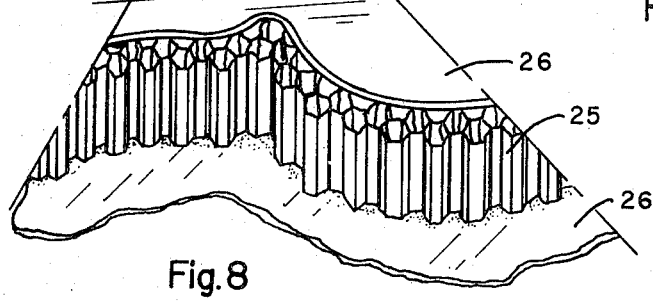
FIG. 8 is an isometric view of a fragment of a typical Verticel panel construction such as used in the present invention.
Figure 9:
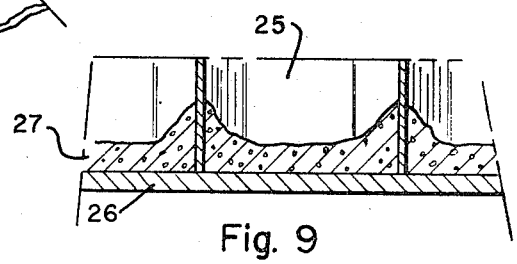
FIG. 9 is a fragmentary sectional detail of a Verticel construction, somewhat diagrammatic and on a greatly enlarged scale, illustrative of an improved mode of forming Verticel panels.

To attain the necessary, lightweight construction and at the same time maintain adequate strength and rigidity, all of the components for this camper, the floor, the walls, the roof and the interior partitions are built with Verticel panels. The general construction of a Verticel panel is illustrated at FIGS. 8 and 9. A Verticel panel is formed as a cellular core 25 of a honeycomb pattern with each side being covered by a skin 26 of rigid sheet material. The core 25 may be a thin metal, but is ordinarily formed of paper sections glued together and accurately cut to a flat surface. The honeycomb of the short, rigid, transversely disposed, hexagonal tubes is also chemically treated to render it fire resistant. The rigid skin 26 may be of a number of different types of material. For the purposes at hand, on the most part, a 12 mil aluminum sheet is adequate although for certain interior partitions walls in the floor structure of the camper, a 32 mil Formica sheet is preferable, the latter being tougher, resistant to denting and a good insulation.

The conventional modes of manufacturing Verticel require that the inner face of each skin be covered with a layer of a heat set adhesive and each opposing surface of the paper honeycomb core also be covered with a layer of this adhesive. Thereupon, the sheets and the core are sandwiched together between a pair of precisely built, precisely positioned platens which are heated to set the adhesive. This conventional sequence of operations, necessary in one way or another, render the Verticel panels unduly expensive even though the cost of the material itself is very moderate.

In order to improve the techniques of bonding the core 25 to the skin plates 26, a new, simplified method was devised by the application of a two-component polyurethane foaming material. For example, such material is disclosed in the U.S. Pat. to J. B. Fitzgibbon, No. 3,334,557. One rapid practical method of applying such foam consisted in passing a skin sheet 26 underneath a spray of the first component of the polyurethane followed by a spray of the second component thereof in order to provide a thin layer of blended materials. Such will shortly commence foaming and at that time the honeycomb core may be placed upon the skin. The use of foam forming polyurethane of various densities is well known and the selection of a comparatively dense, tough, closed pore foam, in the range of 10 to 25 pounds per cubic foot, will produce an extremely tight, but lightweight bond between the skin and the honeycomb core 25. Moreover, as indicated at FIG. 9, the polyurethane material 27 in the course of foaming will fill a very small portion of each cell of the honeycomb to assure a complete adherence thereof even when the skin sheet 26 is not snugly contacting the surface of the core 25, for example, due to a slight imperfection in a platen. Accordingly, wherein in conventional practice a platen or table, which may be 4 to 6 feet wide and 8 to 10 feet long, and requiring finished to a surface within plus or minus 0.001 inch, is very expensive to build, this improved process can use a table finished to a surface of plus or minus 0.010 inch which will cost substantially less. Moreover, with the improved process, heating the material and the use of an upper platen is unnecessary. Polyurethane foam is not only advantageous to provide an improved method for forming Verticel panels; it is also very advantageous in assisting in closing the edges of the panels as will be hereinafter described in detail.

The deck 30 of the camper is formed as a single, rectangular panel trimmed with channel members hereinafter described. The width and length of this deck establishes the size of the camper, and such size is selected to best fit the automobile A whereon the camper C is to be mounted. A Verticel panel, from 1 inch to 2 inches and preferably 1¼ inches thick, is adequate for this deck 30. The undersurface of the panel is a skin of metal such as aluminum having a thickness not sifnificantly in excess of 12 mils. The upper surface which forms a floor deck, whereon the passengers walk, is desirably a thicker and tougher material. A ply or a sheet of Formica or the like, having a thickness of approximately 0.016 mils, is preferable. The thin aluminum skin underneath the deck will have adequate strength to resist substantial bending moments and heavy loads imposed upon the floor deck 30. The thicker ply of Formica can better resist high concentrated stresses, such as, for example, the result of a lady wearing pointed high heels walking upon the floor of the deck.

The rectangular deck 30, mounted upon the top of an automobile, is supported by an array of transversely disposed ribs 31 which are preferably lightweight aluminum channels or like structural members. These channels are secured to the floor section by glueing and suitable anchor bolts 32 which are extended through the floor section and are of a type having large flat heads to distribute their pressure across a substantial portion of the floor.

Figure 4:
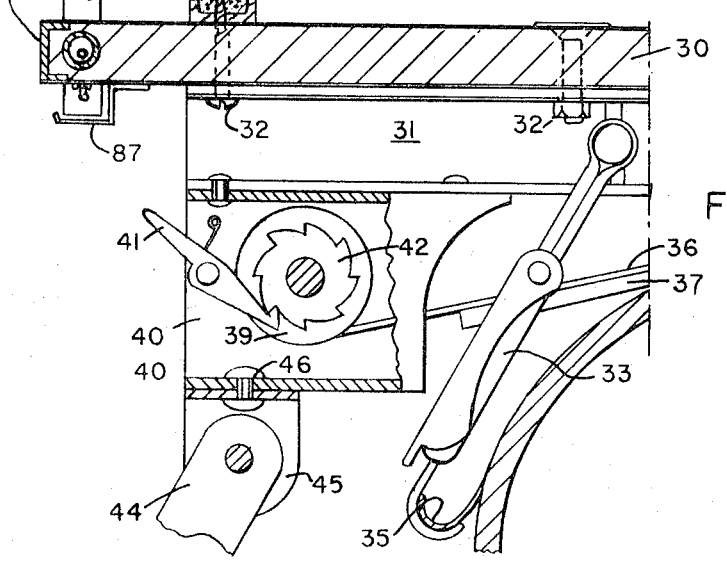
FIG. 4 is a fragmentary portion of the showing at FIG. 3, but on a further enlarged scale and with portions broken away to show parts otherwise hidden from view.

Each end of each rib is secured to the automobile by a toggle clamp 33 which extends from an anchor 34 on the rib 31 and to the gutter 35 on the automobile, the extended end of the clamp being formed as a hook to better engage the gutter, as best illustrated at FIG. 4. The undersurface of each rib will rest upon the curved top of the automobile. To uniformly distribute the pressure of the load upon this curved top, a strap 36 having a resilient pad 37 at its undersurface is attached to the central portion of each rib as by rivets 38 with the ends thereof extending outwardly and downwardly to connect the reels 39 carried in brackets 40 which depend from the ends of the rib 31. Each reel 39 is adapted to be rotated, as by a crank, not shown, to be tightened. Each reel is held by a detent 41 engaging teeth 42 on one flange of the reel. In this arrangement, the undersurface of each rib can be held in position on the automobile regardless of the variation of the auto top. Should it be necessary to support a rib at a position where the automobile top does not extend, struts 43 such as shown at FIG. 1 may be used to extend downwardly from a rib and to any suitable anchor point on the automobile.

Figure 2:
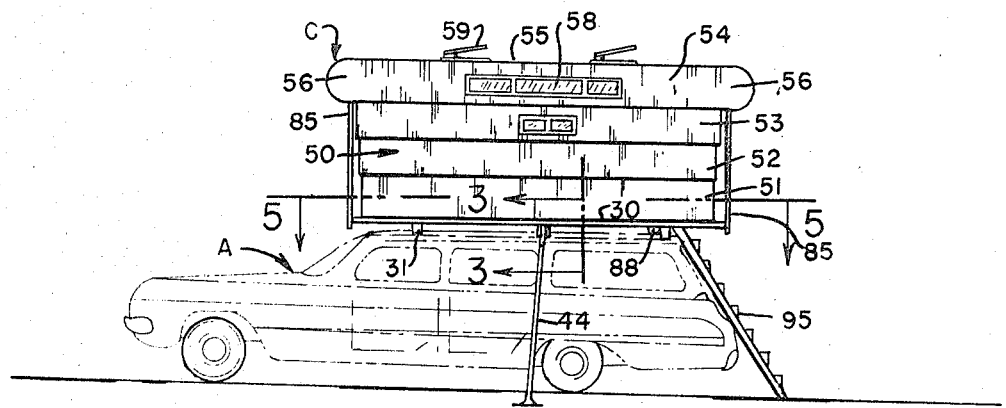
FIG. 2 is a side elevational view similar to FIG. 1, but with the camper being expanded as for use.
Figure 3:
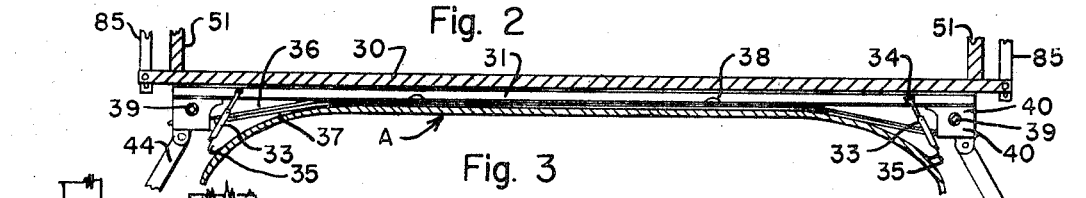
FIG. 3 is a fragmentary, transverse sectional view of the deck portion of the camper, as taken from the indicated line 3—3 at FIG. 2, but on an enlarged scale.

In connection with a rib at or near the center of the deck, stabilizing arms 44 are provided to stabilize the automobile when the camper is in use. Each stabilizing strut 44 is pivotally carried in a rotating clevis 45 which is secured to the underside of a bracket 40 by a pin 46. Thus, when the camper is collapsed for travel, the stabilizing strut 44 may be folded up underneath the deck to an out of the way position. However, when the same is in use, the clevis may be rotated to extend the strut outwardly and downwardly to stabilize the automobile and camper upon it as best illustrated at FIGS. 2 and 3. The wall structure 50 above this deck is formed as a plurality of telescopic segments in an arrangement where the lower segment 51 is within a segment 52 spaced thereabove. The second segment 52 is within a third segment 53 thereabove, and the segment 53 is within the top segment 54. The top segment 54 carries the roof 55 and embraces the others when the camper is collapsed as illustrated at FIG. 1. To obtain adequate headroom when expanded, and a sufficient degree of compaction when compressed, it was found that an optimum arrangement included the four sections, 51, 52, 53 and 54, each being slightly more than 18 inches high. The first section is secured to the deck 30 with a ledge portion of the deck extending beyond this section so that intermediate sections will rest upon the deck while the top section 54 may be slightly larger than the deck and a few inches higher than the other sections so that its lower edge will drop about and embrace not only the intermediate section but also the deck when the unit is collapsed as to the position illustrated at FIG. 1 and 19.

Each end of the top section 54 is formed as a rounded nose 56, formed as a lightweight, end-closed, metallic sheet to provide a neat appearance, some storage space in the unit and aerodynamic stability for travel when the unit is collapsed and the top section embraces all of the other sections.

The camper is provided with an access opening 57, preferably at the rear of the unit as will be further described. Also, it will include suitable side windows 58 in the upper wall sections, ceiling vents 59 and ceiling lights 60 for suitable ventilation and lighting of the unit. The camper will include various items of furniture within it which are not illustrated and need not be described. An arrangement of low benches convertible into beds will extend across the rear and along the sides of the unit. These benches, not shown, are supported upon interior wall portions which upstand from the floor. One wall portion 61 extends across the rear section of the interior and another similar wall portion 62 parallels each side wall of the unit and turns into its adjacent side walls as a rectangular enclosure. The height of these interior wall portions is substantially less than the height of the lower side wall section 51 to permit placing benches upon them and still permit the camper roof to be not more than 18 inches above the floor section when the camper is collapsed. These interior wall portions are interlocked into the floor and the wall 51 to contribute to the rigidity and stiffness of the unit when the Verticel panels are formed and joined together as will now be described.

The critical portion of a Verticel panel is at its edges where the panel has minimum strength against crushing and shear forces. To obviate this disadvantage, the present invention contemplates the use of an improved edging strip E and a simple and unique method of affixing this edging strip to the panel. The strip reinforces the panel to obtain the maximum rigidity and strength and provides an edge form suitable for joining and using the panel in various ways.

Figure 10:
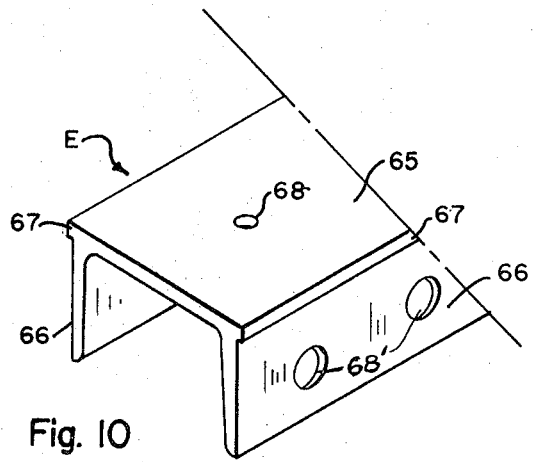
FIG. 10 is an isometric view of a short portion of a cap member used for finishing an edge of a Verticel panel according to the principles of the invention.
Figure 12:
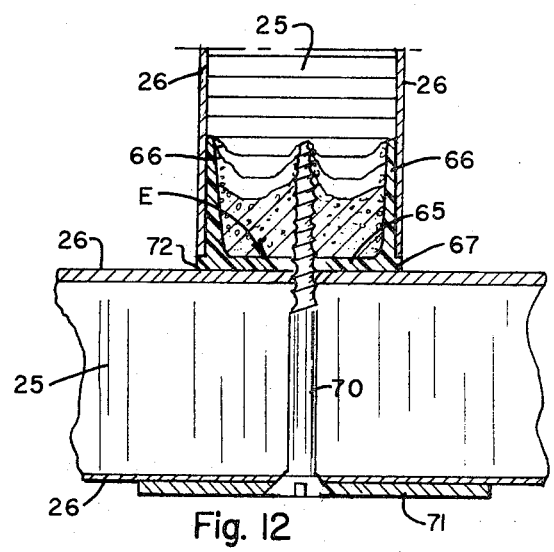
FIG. 12 is a fragmentary sectional detail as taken from the indicated line 12—12 at FIG. 7, but on an enlarged scale and illustrating the interconnection between a partition panel and the floor panel as viewed from the indicated arrow at FIG. 7.
Figure 18:
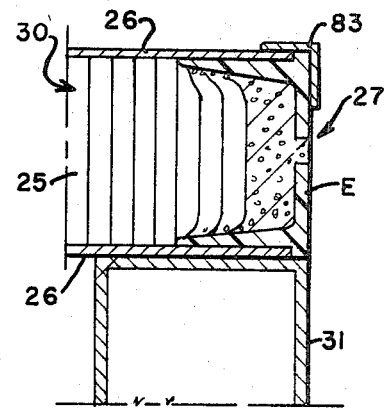

The basic form of the edge structure E is illustrated at FIG. 10. The manner in which it is used is illustrated at FIGS. 11, 12 and 18 and variations from this basic form are illustrated at FIGS. 13 through 17. The edge structure is preferably an extrusion of any one of several suitable rigid plastic materials such as high density polyethylene, polycarbonate or high-impact polystyrene. The formation of such members by extrusion is well known to the art and hence need not be discussed further.

This basic member E is in the form of a "U" having a flat base 65 which will be square with the sides of the panel when fitted into the panel. The outward surfaces of the legs 66 of the "U," normal to the base, lie in spaced parallelism and the legs are spaced apart at a spacing slightly less than the spacing between the Verticel surface sheet skins 26 of the panel which is to be edged. Each corner of this edging strip is formed as a small lip 67 whereagainst the edge of a panel sheet 26 is adapted to abut. When fitted in position, as will be described, the inner surfaces of the panel sheets 26 are glued to the outer surface of the legs 66 to securely hold the edging strip in place. The base 65 and the legs 66 of an edge strip E are comparatively thin with the legs 66 tapering to a thin, almost sharp edge. Thus, an edge strip E is a lightweight member. To complete this basic form of an edge E, vent holes 68 are formed in the base at selected regular spacings to provide fluid relief as will be described.

In preparation of a panel to be reinforced by edge strips E, the panel itself is first cut squarely to a size slightly less than the finished panel dimensions to allow for width of the lips 67. An edging strip E is next inserted into an edge of the panel, between the surface skin sheets, by disrupting the edge of the honeycomb core 25. When the legs 66 are inserted between the sheets 26, and into a position as illustrated at FIG. 11, the legs 66 are glued to the sheets 26 and the inner portion of the edging is secured to the edge cells of the core which were disrupted. A suitable material to accomplish both purposes is a polyurethane foam compound. As heretofore described the foam is available as a two component liquid blend and when the liquids are mixed together, they commence foaming and thereafter, after a short time period, they set into a comparatively rigid, lightweight, expanded foam. In the present invention, selected amounts of the blended foaming liquid are poured into the cavity along the edge of the panel formed by disrupting the core cells or the blended foaming liquid may be introduced into the holes 68 in the base of the edge strip E after it is in place. Part of the liquid will flow between the outer face of the edge strip legs 66 and the sheets 26, and part will foam within the cavity between the edge strip legs, and the remainder, the excess, will flow from the holes 68. By a judicious selection of the amount of foamable polyurethane liquid to be introduced between the legs of the edge strip, an edge strip E will be tightly bonded to a panel with a minimum excess flow from the holes 68. Holes 68' in the legs 66 will facilitate the bonding by direct flow from the cavity to the sheets 26. In this operation, it is to be noted that conduits and the like may be placed within the panel before the edging E is affixed thereto and will be securely held by the foam.

For example, a conduit 69 is shown as being embedded in the wall, as at FIG. 11.

This basic panel edge E is quite versatile in its use and panels may be abutted against each other for interconnection, one to another. For example, the panels of the lower segment 51 and the interior wall portions 61 and 62 are flatly abutted to the deck panel 30 and are glued and bolted into position upon the deck as illustrated at FIG. 12. A screw 70 having a large washer 71 is extended through the undersurface of the deck panel 30 and thence into the edging strip E of the wall panel. At the same time, a layer of a selected glue 72 is applied at the joint. When the glue sets up, the entire unit will be tightly joined and the function of the screw 70 will be secondary.

The edging strip E may be modified in simple ways to permit the several telescoping sections forming the camper walls 50 to be operatively interlocked, and to permit the several panel sections forming various components of the unit to be quickly and easily joined together.

FIG. 13 illustrates a modified edging strip E1 which is useful for engaging the several telescopic walls sections 51, 52, 53 and 54. As illustrated at FIG. 13, the top edge of the lower wall segment 51 is trimmed with a strip E1. This strip is formed with a flat base 65, having legs 66 inserted between the skin sheets 26 of the wall core 25 and glued into position the same as heretofore described. In addition, a ledge 75 outstands from the base of the strip E1 to outstand from the outer face of the section 51. The under edge of the adjacent outer wall segment 52 is also trimmed with a strip E1 the same as above described, and with a ledge 75 outstanding from the base of that strip, to outstand from the inner face of the section 52 and to engage the ledge 75 of the strip E1 on the wall section 51. To obtain a good fit at these interengaging surfaces, each ledge 75 is formed with a sloping, hook-like undersurface 76, which coacts with a corresponding hood of the opposing, mating ledge. To facilitate a smooth sliding fit between the telescoping wall sections, each ledge is formed with a flat, outer edging as at 77, to slide against the opposing wall surface as illustrated.

Figure 14:
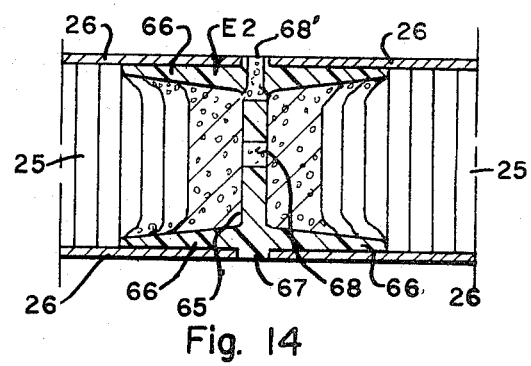

FIG. 14 illustrates another modified edging strip E2 which may be used to butt-join panel sections together. In the strip E2, the base 65 has legs 66 extending from each side thereof to receive the opposing, abutting edges of two panels. The skin sheets 26 of the two panels embrace the legs 66 of the strip E2 and the edge of the core of each panel is disrupted as illustrated. To best use polyurethane foam, not only are holes 68 provided in the base 65, but supplemental holes 68' are provided along one edge to permit release of excess foam.

Figure 15:
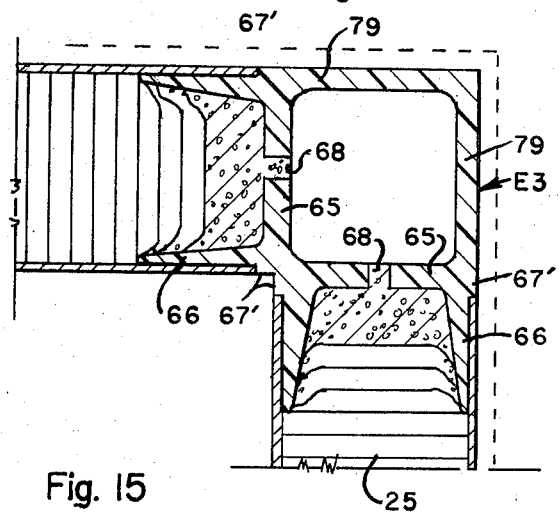

FIG. 15 illustrates another modified edging strip E3 where two panel sections are joined together as a corner, such as the corners of each wall section. In the strip E3 two base portions 65 are connected at a common corner to lie perpendicular to each other. Legs 66 extend outwardly from each base section to receive the cornered edges of two panels. The skin sheets 26 of these panels embrace the legs 66 and abut against lip edges 67' similar to lip 67. The corner itself is formed by wall portions 79 extending in the plane of each outer side of the connected bases 65 and the wall portion 79, in combination with the bases 65, form a hollow, tubular structure. Holes 68 are provided in each base 65 and it is contemplated that excess urethane foam from these holes will be ejected into the hollow structure.

FIG. 16 illustrates another modified edging strip E4 for a corner construction suitable for an inside corner, and this construction is identical to the corner E3, excepting that in lieu of the two wall portions 79 at right angles to each other, the modified edge E4 provides for a curved outer wall 80 to eliminate the comparatively sharp corner edge.

Figure 17:
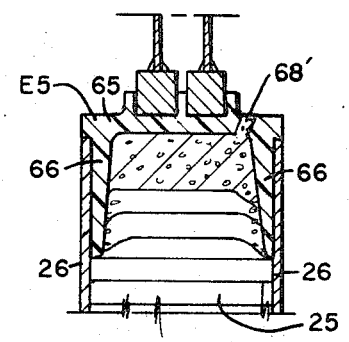

FIG. 17 illustrates another modified edging strip E5 which is especially useful as a window edge and the like. The base 65 of this strip and the legs 66 are formed the same as heretofore described and the manner in which this edging strip is fitted to an edge of a panel is the same. The base 55 includes, however, outstanding strips 81 to form channels to hold window sections 82 as illustrated.

FIG. 18 illustrates further, a mode of finishing the floor section 30 at the access opening 57. An edging strip E is used to finish the edge of the floor section 30 at the opening, and this portion of the floor section is also reinforced by a structural support rib 31. The upper corner, where considerable abuse may be encountered by stepping thereon, is reinforced by a metallic angle strip 83.

FIG. 19 is illustrative of the use of the several sections trimming the Verticel panels used for wall and floor sections. This figure, showing in section an edge of the camper collapsed, illustrates the lower wall section 51 glued to the floor 30 as at 72 and the upper edge of the wall section 51 is trimmed with an edge section E2 having a hook ledge 75. An opposing ledge 75 is at the bottom of the second wall section 52 so these sections interlock when the camper walls are raised. Likewise, the bottom of the third wall section 53 hooks with the top of the second wall section 52 and the bottom of the top wall section 54 hooks with the top of the third wall section 53 by opposing ledges 75. The outer top wall 54 is longer than the other wall sections and also is larger than the deck 30 to completely embrace the entire unit when the camper is collapsed and the wall sections are lowered. The top wall section 54 joins the roof 55 as with a corner connection E4 as shown, and the lower edge of this top wall construction moves against a dust seal guide strip 84 as illustrated. This guide strip prevents the ledge 75 on the wall section 54 from hooking the edge of the deck 30 when the wall section is being raised and also prevents dust from entering the camper when it is lowered. The camper, as shown at FIG. 19 in its lowered arrangement, may be thus secured in any suitable manner, not shown.

An improved and simplified mode of raising and lowering the camper is illustrated at FIGS. 2, 5, 6, 20, 20 and 22. A post 85 is secured at each corner of the top wall segment 54 as by a hinge 86 which permits the post to be folded upwardly and underneath the deck when the camper is collapsed. When so folded, each post may be secured in place by a hook 87 underneath the edge of the deck, as best shown at FIG. 4.

The lifting system is generally indicated at FIG. 22. A transverse shaft 88 is secured to the underside in bearings 89 and is rotated by a reversible motor 90, clockwise and counter clockwise. Lines 91 are wrapped about this shaft and each line extends through a tube 92 in the edge of the floor panel to be directed to and to pass about a sheave 93 at a corner of the floor panel. Thence, a line extends downwardly to connect with the bottom of the support post 85 at that corner of the camper.

It follows that whenever it is desired to expand the camper, the posts are lowered, and the shaft 88 is rotated to take up the lines 91. This pulls the bottom of the posts upwardly to the deck and raises the camper. The light weight of the camper permits a tension on these lines to hold the camper tightly in the fully expanded position. Reversal of the shaft 88 to release the lines 91 effects a lowering of the camper and it is to be noted that this lowering action will not be sudden because of the light weight of the unit, and that if the openings in the unit are closed, the lowering of the sections may be quite slowly and only as the air from within escapes.

A preferred access to the interior of the camper is at the rear of the unit, as by a suitable stairway 95 upwardly and into an opening. This opening 57 includes a space in the floor and a cutout of the lower wall sections 51, 52 and a portion of 53 to provide suitable headroom. The deck 30 and the lower wall section 51 secured thereto, rigidify each other at this opening. The intermediate wall section through which the opening 57 extends, is rigidified at each corner by a gusset plate 96, shown at FIG. 22. A suitable door 97 for this opening is proportioned to close the lower wall section 51 and is secured thereto by hinges 98 to swing to one side when it is opened. A floor cover 99 is pivoted to the lower edge of this door 97 by a piano hinge 100, or the like, to swing upwardly when being opened. A door section 101 for the second wall section 52 is hinged to the top edge of the door 97 as by offset hinges 102 to swing downwardly when being opened. Accordingly, the door 97 carries the floor cover 99 and upper door section 101, the latter being folded against the door 97 when the door is swung to the side on its hinges 98. The partial opening of the third wall section 53 is closed by a small door section 103 which is mounted upon hinges 104 to swing upwardly and out of the way when opened. Suitable holding and locking latches, not shown, may be provided by these door sections.

We have now described our invention in considerable detail. However, it is apparent that others skilled in the art can build and devise alternate and equivalent constructions which are nevertheless within the spirit and scope of the invention. Hence, I desire that my protection be limited, not by the constructions and details illustrated and described, but only by the proper scope of the appended claims.

We claim:

1. In a light weight, collapsible camper having a rigid floor panel adapted to be secured to the top of an automobile or the like, a series of nesting wall sections having a height, when expanded, which is normally greater than the height of an individual using the same, including: a bottom wall section secured to the floor panel, a top wall section, and a roof section secured to the top wall section, the improvement wherein:

the structure, including the floor section, the wall section and the roof section, is formed by interconnected panels with substantially all of these panels having a honeycomb core, a skin sheet bonded to each side of the core and edging strips affixed to the edges of skin sheets and the edges of the cores;

the bottom wall section is rigidly affixed to the floor panel to form an integral component with the bottom wall section reinforcing the floor panel; and the roof section is rigidly affixed to the top wall section to form another integral component.

2. In the organization defined in claim 1, including an:
edging strip which is U-shaped in section to define a base and leg portions in spaced parallelism, said leg portions lying between and being bonded to the inner surfaces of the skin sheets of a panel and the edge of the panel core extending between the leg portions.

3. In the organization defined in claim 1, wherein:
the top wall section of the nestable wall sections embraces and extends about the other wall sections;
the wall sections include outward and inward edge strips at the top and bottom edges which are adapted to interengage with adjacent strips when the wall sections are fully raised;
a lifting means, which includes a rigid bar at the outside of each corner of the camper, hingedly affixed to the top wall section to lie against this section when the camper is retracted and to depend therefrom when the camper is to be extended; and
means at the floor section adapted to hold the bottom of each bar when the bars are depending from the top section of the camper and the wall sections are fully extended.

4. In the organization defined in claim 3, wherein the lifting means includes further:
a winch means at the floor section of the unit;
cords extending from the winch means with a cord extending to each corner of the floor section; and
a guide means at each corner of the floor section turns the cord downwardly with the downward end of the cord connecting to the lower end of the rigid bar at the corner; whereby,
the winch means may be operated to retract and to extend all of the cords in unison to raise and lower the wall sections of the camper in an even, uniform manner.

5. In a light weight, collapsible camper having a rigid floor panel adapted to be secured to the top of an automobile or the like, a series of nesting wall sections having a height, when expanded, which is normally greater than the height of an individual using the same, including: a bottom wall section secured to the floor panel, a top wall section, and a roof section secured to the top wall section, the improvement wherein:
the floor section, the wall sections and the roof section are formed by interconnected panels, with substantially all of these panels having a honeycomb core, a skin sheet bonded to each side of the core and edging strips affixed to the edges of the skin sheets and edges of the cores;
the bottom wall section is rigidly affixed to the floor of the panel to form an integral component with the wall section reinforcing the panel floor; and
an interior wall section having a height approximating the height of the bottom wall section is rigidly affixed to the floor section and to the bottom wall section to form an integrated reinforced unit.

6. In a light weight, collapsible camper having a rigid floor panel adapted to be secured to the top of an automobile or the like, a series of nesting wall sections having a height, and when expanded, which is normally greater than the height of an individual using the same, including: a bottom wall section secured to the floor panel, a top wall section, and a roof section secured to the top wall section, the improvement wherein:
the floor section is adapted to be mounted upon the top of an automobile;
a plurality of spaced, transverse reinforcing members extend underneath the floor section;
a hold-down means securely connects each end of each reinforcing member to the top of the automobile; and
a contour forming means is provided at the underside of each reinforcing member to conform with the contour of the automobile top when the hold-down means is secured to the automobile top, said contour forming means including:
a strap underneath the reinforcing means; and
means for tightening the strap at one end thereof.

7. In the organization defined in claim 6, wherein:
the means for tightening the strap includes a ratchet member.

* * * * *